United States Patent
Alecu

(10) Patent No.: US 10,480,407 B2
(45) Date of Patent: Nov. 19, 2019

(54) HEAT EXCHANGER ASSEMBLY FOR ENGINE BLEED AIR

(71) Applicant: PRATT & WHITNEY CANADA CORP., Longueuil (CA)

(72) Inventor: Daniel Alecu, Brampton (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 306 days.

(21) Appl. No.: 15/412,179

(22) Filed: Jan. 23, 2017

(65) Prior Publication Data

US 2018/0209338 A1 Jul. 26, 2018

(51) Int. Cl.
| | |
|---|---|
| *F02C 6/08* | (2006.01) |
| *F02C 3/04* | (2006.01) |
| *F02C 7/18* | (2006.01) |
| *B64D 27/10* | (2006.01) |
| *F02C 6/12* | (2006.01) |
| *B64D 15/04* | (2006.01) |
| *B64D 13/06* | (2006.01) |

(52) U.S. Cl.
CPC ............... *F02C 6/08* (2013.01); *B64D 27/10* (2013.01); *F02C 3/04* (2013.01); *F02C 6/12* (2013.01); *F02C 7/185* (2013.01); *B64D 13/06* (2013.01); *B64D 15/04* (2013.01); *B64D 2013/0618* (2013.01); *F05D 2220/40* (2013.01); *F05D 2260/213* (2013.01)

(58) Field of Classification Search
CPC ...... F02C 9/18; F02C 6/08; F02C 6/12; F02C 7/047; B64D 15/04; B64D 13/00; B64D 13/006; B64D 13/022; B64D 13/06; B64D 2013/0618
See application file for complete search history.

(56) References Cited

U.S. PATENT DOCUMENTS

| 4,107,927 A | * | 8/1978 | Gordon, Jr. ............ F01D 25/125 60/605.1 |
| 4,996,839 A | * | 3/1991 | Wilkinson ............ F02B 37/005 60/247 |
| 5,137,230 A | * | 8/1992 | Coffinberry ............. B64C 21/06 244/118.5 |
| 5,452,573 A | * | 9/1995 | Glickstein ................ F02C 6/08 60/39.183 |

(Continued)

*Primary Examiner* — Craig Kim
(74) *Attorney, Agent, or Firm* — Norton Rose Fulbright Canada L.L.P.

(57) ABSTRACT

An aircraft engine that includes an engine core having a core compressor and a core turbine for receiving a core flow, a bypass conduit for receiving a bypass flow, a heat exchanger having at least one first passage and at least one second passage in heat exchange relationship with one another, and a turbocharger having a turbocharger compressor and a turbocharger turbine in driving engagement with each other. An inlet of the turbocharger compressor is in fluid communication with an environment of the aircraft engine. An outlet of the turbocharger compressor is fluidly connected to the bypass conduit through the at least one first passage of the heat exchanger. The core compressor is fluidly connected to an inlet of the turbocharger turbine through the at least one second passage of the heat exchanger such that the turbocharger turbine is located downstream of the heat exchanger relative to a flow circulating in the at least one second passage.

20 Claims, 2 Drawing Sheets

(56) References Cited

U.S. PATENT DOCUMENTS

| | | | |
|---|---|---|---|
| 6,526,751 B1* | 3/2003 | Moeckel | F02B 29/0475 |
| | | | 60/599 |
| 8,276,392 B2 | 10/2012 | Van Der Woude | |
| 8,955,794 B2* | 2/2015 | Mackin | F02C 6/08 |
| | | | 244/134 R |
| 9,284,057 B2* | 3/2016 | Kelnhofer | B64D 13/06 |
| 9,470,153 B2 | 10/2016 | Suciu et al. | |
| 2004/0062644 A1* | 4/2004 | Meshenky | F01D 25/12 |
| | | | 415/179 |
| 2017/0268430 A1* | 9/2017 | Schwarz | F02C 9/18 |

* cited by examiner

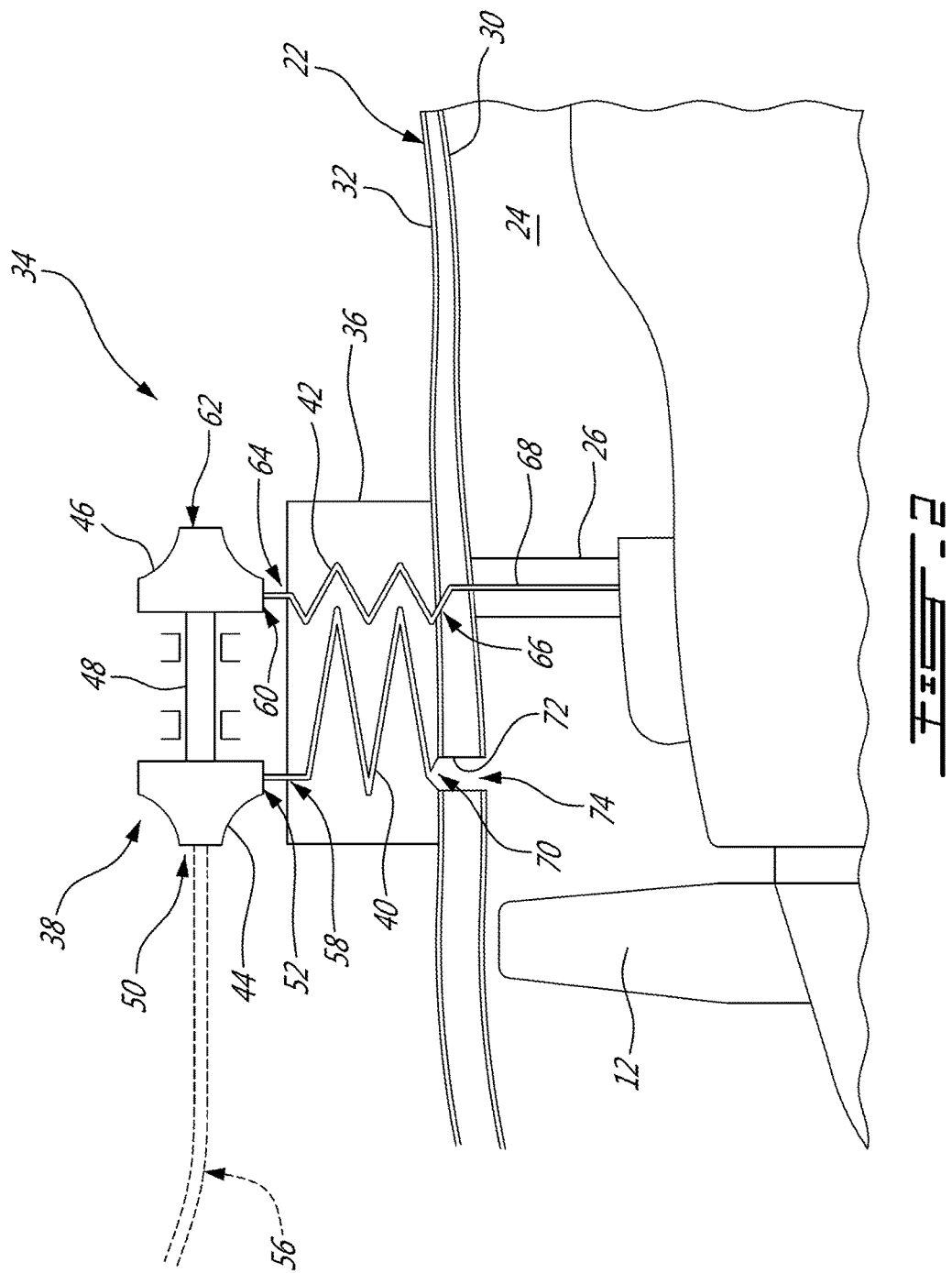

HEAT EXCHANGER ASSEMBLY FOR ENGINE BLEED AIR

TECHNICAL FIELD

The application relates generally to aircraft engines and, more particularly, to the cooling of bleed air used in such engines.

BACKGROUND OF THE ART

Aircraft systems such as environmental control systems and wing anti-ice systems require hot air for proper operation. Typically, the hot air is provided by an engine of the aircraft by extraction from a compressor of the engine. The extracted air is then routed to the aircraft systems in need.

The extraction of air from the compressor negatively impacts the engine performance since the extracted air is not used to generate thrust. Such impact becomes more and more important since trends in engine design are oriented toward an increase of the bypass ratio. The core flow thus becomes smaller, but the different systems still require the same quantity of hot air.

SUMMARY

In one aspect, there is provided an aircraft engine, comprising: an engine core having a core compressor and a core turbine for receiving a core flow, and a bypass conduit for receiving a bypass flow; a heat exchanger having at least one first passage and at least one second passage in heat exchange relationship with one another; and a turbocharger having a turbocharger compressor and a turbocharger turbine in driving engagement with each other, an inlet of the turbocharger compressor being in fluid communication with an environment of the aircraft engine, an outlet of the turbocharger compressor being fluidly connected to the bypass conduit through the at least one first passage of the heat exchanger; wherein the core compressor is fluidly connected to an inlet of the turbocharger turbine through the at least one second passage of the heat exchanger such that the turbocharger turbine is located downstream of the heat exchanger relative to a flow circulating in the at least one second passage.

In another aspect, there is provided a heat exchanger assembly for aircraft engine bleed air, comprising: a turbocharger including a compressor and a turbine in driving engagement with the compressor, the compressor having an inlet configured to be in fluid communication with ambient air; and a heat exchanger having at least one first passage and at least one second passage in heat exchange relationship with one another, an inlet of the at least one second passage configured to receive bleed air from the aircraft engine, an inlet of the turbine being fluidly connected to an outlet of the at least one second passage, an outlet of the compressor being fluidly connected to an inlet of the at least one first passage.

In a further aspect, there is provided a method for providing air to a system of an aircraft engine, comprising: extracting ambient air from an environment surrounding the aircraft engine to create a first airflow; extracting bleed air from a compressor of the aircraft engine to create a second airflow; compressing the first airflow; reducing a temperature of the second airflow by transferring heat from the second airflow to the compressed first airflow; and after transferring the heat to the compressed first airflow: further reducing the temperature of the second airflow by expanding the second airflow, and providing the expanded second airflow to the system of the aircraft engine, and creating thrust by expelling the compressed first airflow in a bypass conduit of the aircraft engine.

DESCRIPTION OF THE DRAWINGS

Reference is now made to the accompanying figures in which:

FIG. 2 is a schematic cross-sectional view of the heat exchanger assembly of FIG. 1.

DETAILED DESCRIPTION

Figure 1:
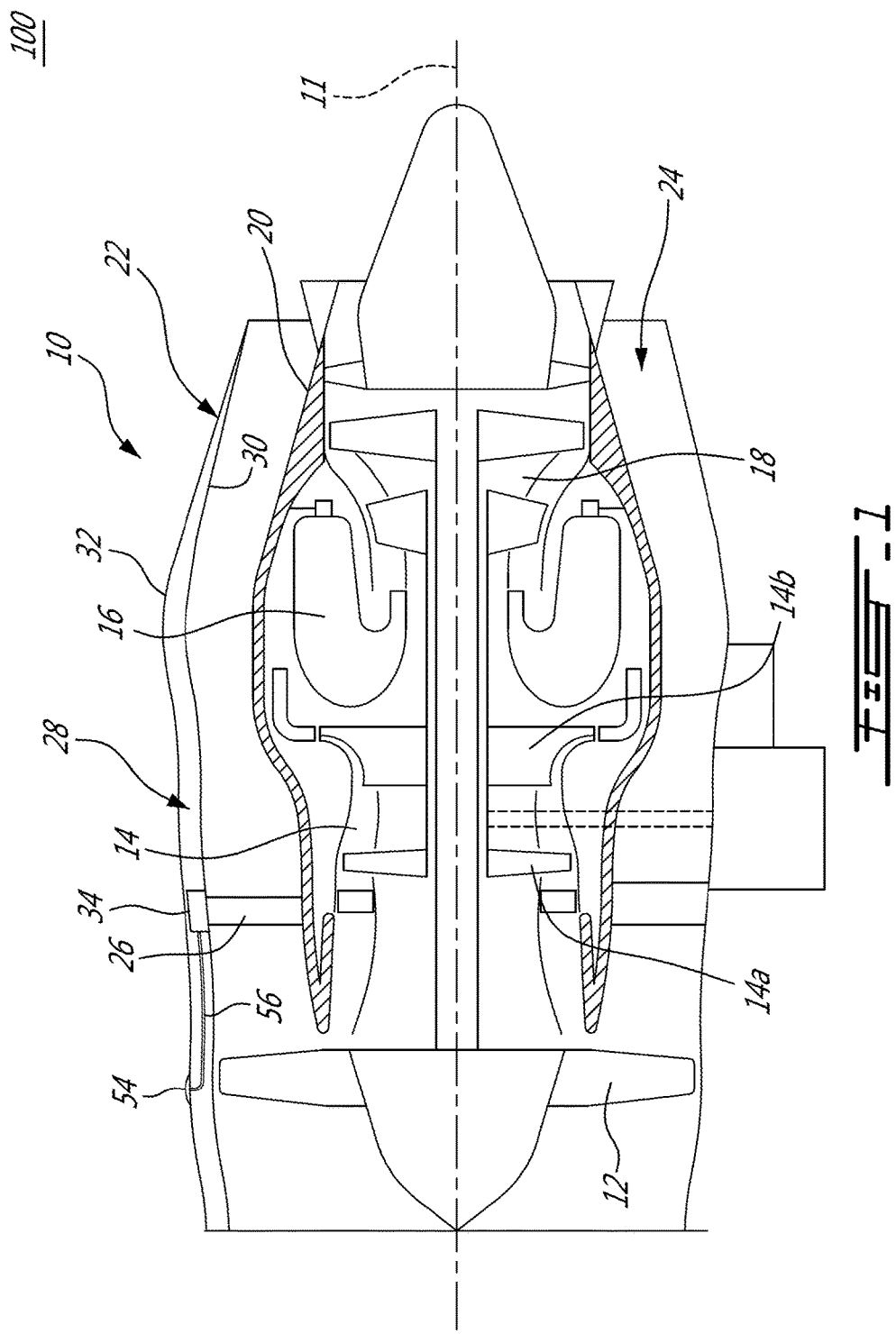
FIG. 1 is a schematic cross-sectional view of a gas turbine engine comprising a heat exchanger assembly in accordance with a particular embodiment.

FIG. 1 illustrates an aircraft engine 10 configured as a gas turbine engine of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

In the embodiment shown, the compressor 14, the combustor 16 and the turbine 18 are components comprised in an engine core to receive a core flow, and are surrounded by an engine core case 20. The engine 10 further has an outer case 22 disposed around the engine core case 20 and defining a bypass conduit 24 therebetween, configured for receiving a bypass flow. The outer case 22 is structurally supported by struts 26 extending between the outer case 22 and the engine core case 20. In the illustrated embodiment, the outer case 22 includes an inner wall 30 and an outer wall 32 which are spaced apart from each other and define an annular space 28 therebetween.

It is understood that the configuration of the engine 10 shown is exemplary only, and that any other suitable configuration may alternately be used. As non-limiting examples, the engine 10 may be a turboprop engine, with the bypass conduit 24 disposed spaced from the core flow without surrounding the engine core; the engine 10 may be a compound cycle engine where the combustor 16 is omitted and replaced by an internal combustion engine, with the turbine section 18 receiving the exhaust from the internal combustion engine and compounded therewith, and the compressor section 14 feeding compressed air to the internal combustion engine and being driven by the internal combustion engine and/or the turbine section 18. Other configurations are also possible.

The engine 10 further has a heat exchanger assembly 34. In the illustrated embodiment, the heat exchanger assembly 34 is mounted within the annular space 28 of the outer case 22. It is understood that the heat exchanger assembly 34 can alternately be mounted at any other suitable location, including, but not limited to, within one of the struts 26 extending between the engine core case 20 and the inner wall 30 of the outer case 22. The heat exchanger assembly 34 is used to provide air to systems such as, but not limited to, the environmental control system and the wing anti-ice system.

Referring to FIG. 2, the heat exchanger assembly 34 comprises a heat exchanger 36 and a turbocharger 38. The heat exchanger 36 has at least one first passage 40 to receive cool air and at least one second passage 42 to receive hot air. The first passage(s) 40 and the second passage(s) 42 are in heat exchange relationship such that heat from the air circulating in the second passage(s) 42 is transferred to the air circulating in the first passage(s) 40. In the embodiment shown, the heat exchanger 36 is a counter-flow heat exchanger.

Although only one first passage 40 and second passage 42 is shown, it is understood that the heat exchanger 36 may include an array of first passages 40 and/or of second passages 42. The heat exchanger 36 may have any suitable configuration, such that the passages 40, 42 may be defined by, for example, cross-flow or counter flow plates, plates and fins, tube(s) (helical or other configuration) in shell, tube(s) in tube(s), a 3D-printed micro-structure, etc. Other configurations are also possible.

The turbocharger 38 of the heat exchanger assembly 36 has a compressor 44 and a turbine 46 in driving engagement with the compressor 44. In the illustrated embodiment, the rotors of the compressor 44 and the turbine 46 are mounted on a shaft 48 and rotate integrally therewith. In a particular embodiment, a ratio of a gas path cross-sectional area of the turbocharger compressor 44 over a gas path cross-sectional area of the engine core of the engine 10 is from 1/50 to 1/16. In a particular embodiment, the pressure ratio of the compressor 44 of the turbocharger 38 is higher than the pressure ratio of the fan 12.

In the embodiment shown, an inlet 50 of the turbocharger compressor 44 is fluidly connected to a scoop 54 (FIG. 1) defined through the outer wall 32 of the outer case 22. A pipe 56 is used to connect the scoop 54 to the inlet 50 of the compressor 44. An outlet 52 of the compressor 44 is fluidly connected to an inlet 58 of the first passage 40 of the heat exchanger 36.

In the illustrated embodiment, an outlet 70 of the first passage 40 of the heat exchanger 36 is fluidly connected to the bypass conduit 24 via a discharge conduit 72; the outlet 52 of the compressor 44 of the turbocharger 38 is thus connected to the bypass conduit 24 through the first passage 40 of the heat exchanger 36. In a particular embodiment, the discharge conduit 72 is open perpendicular to the main bypass flow or slightly angled downstream. The discharge conduit 72 is designed to maximize the discharge area and to minimize the perturbation of the bypass flow circulating in the bypass conduit 24. The discharge flow adds mass and energy into the bypass flow, which creates supplementary thrust as it is accelerated in the bypass conduit 24. For that purpose, an outlet 74 of the discharge conduit 72 is defined through the inner wall 30 of the outer case 22. In the illustrated embodiment, the outlet 74 is provided in the form of an aperture in the inner wall 30 of the outer case 22, downstream of the fan 12.

An inlet 66 of the second passage 42 of the heat exchanger 36 is fluidly connected to the compressor section 14 of the engine 10, for example to the high-pressure compressor 14b, and configured to receive air that is extracted, or bled, from said compressor 14b. In the embodiment shown, a pipe 68 disposed within one of the struts 26 is used to connect the high-pressure compressor 14b to the inlet 66 of the second passage 42.

An inlet 60 of the turbine 46 of the turbocharger 38 is fluidly connected to an outlet 64 of the second passage 42 of the heat exchanger 36; the compressor 14 of the engine 10 is thus connected to the inlet 60 of the turbine 46 of the turbocharger 38 through the second passage 42 of the heat exchanger 36. Accordingly, the turbine 46 is located downstream of the heat exchanger 36 relative to an air flow circulating in the second passage 42 of the heat exchanger 36. The turbine 46 is driven by the bleed air flow from the high-pressure compressor 14b circulating in the second passage 42, and uses its mechanical energy to drive the compressor 44. An outlet 62 of the turbine 46 is fluidly connected to the system(s) that require hot air. Such systems may be, for example, the environmental control system and/or the wing anti-ice system.

In a particular embodiment, the compressor 44 of the turbocharger 38 has a compressor pressure ratio from 2 to 2.5, or from 2 to 3.5, at an efficiency of from 70% to 75%. The pressure ratio is defined as a ratio between an air pressure at the outlet 52 over an air pressure at the inlet 50. The air pressure is thus increased by from 200% to 350% through the compressor 44.

Also according to a particular embodiment, the turbine 46 of the turbocharger 38 has a turbine pressure ratio of approximately 3.5 at an efficiency of 80% for single stage turbine. The pressure ratio may be higher for a multi-stage turbine; in a particular embodiment, the pressure ratio is accordingly at least 3.5. The turbine pressure ratio is defined as a ratio between an air pressure at the inlet 60 over an air pressure at the outlet 62. The air pressure is thus reduced by approximately 350%, or at least 350%, through the turbine 46.

In a particular embodiment, the configuration of the heat exchanger assembly 34 allows for the size of the heat exchanger 36 to be reduced or minimized by having the compressor 44 of the turbocharger 38 upstream of the heat exchanger 36 relative to a flow circulating in the first passage 40 of the heat exchanger 36. By compressing the air in the compressor 44, the air density is increased which results in a greater potential of heat exchange in the heat exchanger 36. Similarly, the heat exchanger efficiency is correlated to the temperature difference between the flows circulating in the first 40 and second 42 passages. The higher the temperature difference, the more efficient is the heat exchanger. In the illustrated embodiment, the heat exchanger 36 is upstream of the turbine 46 of the turbocharger 38 relative to a flow circulating in the second passage 42. The heat exchanger 36 is thus configured to receive air directly from the compressor section 14, where it is at its highest temperature, before it enters the turbine 46 in which it is further cooled.

In use, to provide air to the systems in need, a flow of bleed air is first extracted from the high-pressure compressor 14b of the engine 10. Another flow of air is also extracted from an environment 100 (FIG. 1) surrounding the engine 10 and compressed. In a particular embodiment, the extracted air is compressed in the compressor 44 of the turbocharger 38. In a particular embodiment, the ambient air is compressed by from about 200% to about 350%. In a particular embodiment, the ambient air, before entering in the compressor 44, is compressed through a scoop 54 defined in the outer wall 32 of the outer case 22. In a particular embodiment, the scoop 54 is a lambda wall-flushed scoop, and has a recovery ratio (efficiency of the scoop 54 to transform kinetic energy of the ambient air flow into static pressure) of for example 60%; in another particular embodiment, the scoop 54 is an extended Pitot-scoop, and has a recovery ratio of for example 90%. It is understood that any suitable scoop configuration and recovery ratio may alternately be used. In a particular embodiment, the recovery ratio has a value from 60% to 90%.

A temperature of the bleed air, for example originally at about 515 Celsius, is reduced by transferring heat from the bleed air to the ambient air. In a particular embodiment, the bleed air temperature is reduced by about 100 Celsius, for example to about 415 Celsius. In a particular embodiment, this step is performed in the heat exchanger 36, where the first passage(s) 40 receive(s) the air flow that has been compressed in the compressor 44 while the second passage(s) 42 receive(s) the bleed air flow. The passages 40 and 42 are in heat exchange relationship with one another. In the present embodiment, a temperature of an air flow circulating in the first passage 40 is heated to have a temperature at the outlet of the first passage 40 of from 140 Celsius (e.g. for a compressor pressure ratio of 2) to 235 Celsius (e.g. for a compressor pressure ratio of 3.5). In a particular embodiment, a temperature of the bleed air flow circulating in the second passage 42 is reduced to a temperature of about 415 Celsius (outlet of the second passage 42) from a temperature of about 515 Celsius (inlet of the second passage 42).

The bleed air is expanded to further reduce the bleed air temperature. In a particular embodiment, the expansion is carried in the turbine 46 of the turbocharger 38. In a particular embodiment, the bleed air temperature is reduced by approximately 165 Celsius through its expansion in the turbine 46. In a particular embodiment, such temperature reduction is obtained while the pressure is reduced by about 350%. In a particular embodiment, the bleed air temperature at the outlet 62 of the turbine 46 is approximately 250 Celsius.

In a particular embodiment, thrust is then created by injecting the air that has been compressed in the compressor 44 of the turbocharger 46, and heated through the heat exchanger 36, in the bypass conduit 24. By re-injecting the air, a portion of the thrust that has been lost due to the extraction of the bleed air from the compressor 14 is recovered. In a particular embodiment, the air is injected through the discharge conduit 72 opening to an outlet 74 defined in the inner wall 30 of the outer case 22.

In a particular embodiment of a prior art gas turbine engine, air enters the engine at Mach 0.8 and exits the engine at Mach 1.0. If 2.5% of the total mass flow of the engine 10, corresponding to the mass flow of the engine core and the mass flow of bypass, is extracted to supply air to the different systems, 97.5% of the mass flow that enters the engine at Mach 0.8 exits the engine at Mach 1.0. The net thrust corresponds to the Mach 0.2 acceleration between the outlet and inlet engine flows. However, the 2.5% of the incoming flow that has been extracted at Mach 0.1 does not contribute to the thrust. Therefore, it is considered as being drag and must be subtracted from the net thrust. The net thrust can be defined as follows:

Net thrust=1.0*97.5%−0.8*100%=0.2*100%−1.0*2.5%

The resulting drag due to the bleed flow extraction can be defined as percentage of the total thrust without bleed as follows:

$$\frac{\text{Drag}}{\text{Thrust}} = \frac{1.0*2.5\%}{0.2*100\%} = 12.5\%$$

In a particular embodiment in accordance with a gas turbine engine of the present disclosure, 2.5% of the engine core flow is extracted to supply the different systems. To compensate for this loss in the core flow, 2.5% is added in the bypass conduit 24 through the compressor 44 of the turbocharger 34; 100% of the flow entering the engine at Mach 0.8 thus exits the engine at Mach 1.0. Accordingly, although the thrust of the engine core flow is reduced, the thrust of the bypass flow is increased. In a particular embodiment, the net thrust is calculated as follows:

Net thrust=1.0*100%−0.8*102.5%=0.2*100%−0.8*2.5%

The resulting drag due to the bleed flow extraction can be defined as percentage of the total thrust without bleed as follows:

$$\frac{\text{Drag}}{\text{Thrust}} = \frac{0.8*2.5\%}{0.2*100\%} = 8\%$$

Accordingly, in a particular embodiment, the drag is 64% (e.g. reduced from 12.5% to 8%) of that of the prior art gas turbine engine described above. It is understood that the numbers detailed herein above are by way of examples only and that the present disclosure is not limited thereby.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. An aircraft engine, comprising:
an engine core having a core compressor and a core turbine for receiving a core flow, and a bypass conduit for receiving a bypass flow;
a heat exchanger having at least one cool air passage and at least one hot air passage in heat exchange relationship with one another; and
a turbocharger having a turbocharger compressor and a turbocharger turbine in driving engagement with each other, an inlet of the turbocharger compressor being in fluid communication with ambient air, an outlet of the turbocharger compressor being fluidly connected to the bypass conduit through the at least one cool air passage of the heat exchanger;
wherein the core compressor is fluidly connected to an inlet of the turbocharger turbine through the at least one hot air passage of the heat exchanger such that the turbocharger turbine is located downstream of the heat exchanger relative to a flow circulating in the at least one hot air passage.

2. The aircraft engine as defined in claim 1, wherein the inlet of the turbocharger compressor is in fluid communication with the environment through a scoop defined in an outer wall of an outer case surrounding the bypass conduit.

3. The aircraft engine as defined in claim 1, wherein the heat exchanger and the turbocharger are mounted between an inner wall and an outer wall of an outer case surrounding the bypass conduit.

4. The aircraft engine as defined in claim 1, wherein a ratio of a gas path cross-sectional area of the turbocharger compressor over a gas path cross-sectional area of the engine core has a value from 1/50 to 1/16.

5. The aircraft engine as defined in claim 1, wherein a pressure ratio of the turbocharger turbine is at least 3.5.

6. The aircraft engine as defined in claim 1, wherein a pressure ratio of the turbocharger compressor is from 2 to 3.5.

7. The aircraft engine as defined in claim 1, wherein rotors of the turbocharger turbine and of the turbocharger compressor are mounted on a common shaft and rotate integrally therewith.

8. A heat exchanger assembly for aircraft engine bleed air, comprising:
- a turbocharger including a compressor and a turbine in driving engagement with the compressor, the compressor having an inlet configured to be in fluid communication with ambient air; and
- a heat exchanger having at least one cool air passage and at least one hot air passage in heat exchange relationship with one another, an inlet of the at least one hot air passage configured to receive bleed air from an aircraft engine, an inlet of the turbine being fluidly connected to an outlet of the at least one hot air passage, an outlet of the compressor being fluidly connected to an inlet of the at least one cool air passage.

9. The heat exchanger assembly as defined in claim 8, wherein a pressure ratio of the turbine is at least 3.5.

10. The heat exchanger assembly as defined in claim 8, wherein a pressure ratio of the compressor is from 2 to 3.5.

11. The heat exchanger assembly as defined in claim 8, wherein rotors of the turbine and the compressor are mounted on a common shaft and rotate integrally therewith.

12. The heat exchanger assembly as defined in claim 8, further comprising a scoop in fluid communication with the inlet of the compressor.

13. A method for providing air to a system of an aircraft engine, comprising:
- extracting ambient air from an environment surrounding the aircraft engine to create a first airflow;
- extracting bleed air from a compressor of the aircraft engine to create a second airflow;
- compressing the first airflow to provide a compressed first airflow;
- circulating the compressed first airflow and the second airflow through a heat exchanger so as to reduce a temperature of the second airflow by transferring heat from the second airflow to the compressed first airflow; and
- after transferring the heat to the compressed first airflow:
  - further reducing the temperature of the second airflow by expanding the second airflow, and providing the expanded second airflow to the system of the aircraft engine, and
  - creating thrust by expelling the compressed first airflow in a bypass conduit passage of the aircraft engine.

14. The method as defined in claim 13, wherein compressing the first airflow includes compressing the ambient air through a scoop and further compressing the first airflow through a compressor of a turbocharger.

15. The method as defined in claim 13, wherein transferring heat from the second airflow to the compressed first airflow includes receiving the compressed first airflow in a first passage of the heat exchanger and receiving the second airflow in a second passage of the heat exchanger.

16. The method as defined in claim 13, wherein compressing the first airflow increases a pressure of the first airflow by at least 200%.

17. The method as defined in claim 13, wherein expanding the second airflow decreases a pressure of the second airflow by approximately 350%.

18. The method as defined in claim 13, wherein transferring the heat from the second airflow to the first airflow reduces the temperature of the second airflow by approximately 165 Celsius.

19. The method as defined in claim 13, wherein expanding the second airflow reduces the temperature of the second airflow by approximately 100 Celsius.

20. The method as defined in claim 13, wherein expanding the second airflow is performed while driving a turbocharger turbine and compressing the first airflow is performed with a turbocharger compressor driven by the turbocharger turbine.

* * * * *